(12) United States Patent
Hsu et al.

(10) Patent No.: US 10,481,913 B2
(45) Date of Patent: Nov. 19, 2019

(54) TOKEN-BASED DATA DEPENDENCY PROTECTION FOR MEMORY ACCESS

(71) Applicant: MediaTek Singapore Pte. Ltd., Singapore (SG)

(72) Inventors: Steve Hengchen Hsu, San Diego, CA (US); Hsiao-Han Ma, Hsinchu (TW); Chia-An Lin, Hsinchu (TW); Wei-Lun Hung, New Taipei (TW); Dan MingLun Chuang, San Diego, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 53 days.

(21) Appl. No.: 15/967,619

(22) Filed: May 1, 2018

(65) Prior Publication Data

US 2019/0056953 A1 Feb. 21, 2019

Related U.S. Application Data

(60) Provisional application No. 62/546,033, filed on Aug. 16, 2017.

(51) Int. Cl.
*G06F 9/38* (2018.01)
*G06F 9/30* (2018.01)

(52) U.S. Cl.
CPC ........ *G06F 9/3836* (2013.01); *G06F 9/30043* (2013.01); *G06F 9/30145* (2013.01)

(58) Field of Classification Search
None
See application file for complete search history.

(56) References Cited

U.S. PATENT DOCUMENTS

| 5,488,729 | A | * | 1/1996 | Vegesna | G06F 9/30112 |
| | | | | | 712/209 |
| 5,682,493 | A | * | 10/1997 | Yung | G06F 9/3824 |
| | | | | | 712/217 |
| 5,717,946 | A | * | 2/1998 | Satou | G06F 9/30018 |
| | | | | | 710/35 |
| 7,937,559 | B1 | * | 5/2011 | Parameswar | G06F 9/30014 |
| | | | | | 712/36 |
| 2001/0042187 | A1 | * | 11/2001 | Tremblay | G06F 9/30112 |
| | | | | | 712/2 |
| 2002/0129227 | A1 | * | 9/2002 | Arakawa | G06F 9/30087 |
| | | | | | 712/228 |
| 2018/0113713 | A1 | * | 4/2018 | Cheng | G06F 8/41 |

* cited by examiner

Primary Examiner — William B Partridge
(74) Attorney, Agent, or Firm — Tong J. Lee

(57) ABSTRACT

A device protects data dependency for memory access. The device includes a memory and a processor. The processor executes memory access instructions including load instructions and store instructions. The processor includes load circuitry to execute the load instructions; and store circuitry to execute the store instructions. Each memory access instruction includes a token index field containing a token index that associates the memory access instruction with a memory location. The processor further includes dispatch circuitry to dispatch instructions to the load circuitry and the store circuitry; and a token registry to record used token indices according to token index fields in the memory access instructions dispatched by the dispatch circuitry.

20 Claims, 7 Drawing Sheets

TOKEN-BASED DATA DEPENDENCY PROTECTION FOR MEMORY ACCESS

CROSS-REFERENCE TO RELATED APPLICATIONS

This application claims the benefit of U.S. Provisional Application No. 62/546,033 filed on Aug. 16, 2017, the entirety of which is incorporated by reference herein.

TECHNICAL FIELD

Embodiments of the invention relate to a data dependency protection mechanism for memory access in computing systems.

BACKGROUND

Data hazards occur when data is used before it is ready. With respect to memory access, data hazards may occur when two memory access instructions having data dependency are in the execution pipeline at the same time. An example of such data dependency may be when a vector load instruction and a vector store instruction access the same memory region or overlapping memory regions. Data hazards caused by memory access instructions include Read-After-Write (RAW) hazards and Write-After-Read (WAR) hazards.

A WAR hazard occurs when a store instruction follows a load instruction, both accessing the same memory location. A RAW hazard occurs when the load instruction follows the store instruction. To prevent these hazards, one conventional solution checks memory address range used by the memory access instructions. The memory range for a vector load/store instruction can be defined by a start point, end point and length. If there is an overlap in the memory ranges accessed by a vector load/store pair, the latter memory access is stopped until the first one is complete. However, the range-checking mechanism in large memory addressing space is usually tedious and time-consuming. Memory pointers may be resolved at a late pipeline stage, which further delays the latter memory access. When there are multiple instructions in the various pipelines stages of function units, the complexity range-checking logics may grow exponentially thereby significantly increasing hardware cost.

Another conventional solution is to set a memory barrier during the execution of a memory access instruction. All of the subsequent instructions, whether or not having data dependency with the instruction being executed, are stalled. The memory barrier causes significant performance degradation because it places a broad range of the processor's function units and data path pipelines in an idle state. The memory barrier is also inefficient, because some of the stalled instructions cannot be executed even though they may have no data dependency with the currently-executed instruction.

SUMMARY

In one embodiment, a device is provided to protect data dependency for memory access. The device comprises a memory, and a processor coupled to the memory to execute memory access instructions including load instructions and store instructions. The processor includes load circuitry to execute the load instructions; and store circuitry to execute the store instructions. Each memory access instruction includes a token index field containing a token index that associates the memory access instruction with a memory location. The processor further includes dispatch circuitry to dispatch instructions to the load circuitry and the store circuitry; and a token registry to record used token indices according to token index fields in the memory access instructions dispatched by the dispatch circuitry.

In another embodiment, a method is provided for protecting data dependency for memory access. The method comprises: receiving a memory access instruction having a token index field containing a token index that associates the memory access instruction with a memory location; performing a token check with a token register, which records used token indices according to token index fields in memory access instructions; and executing the memory access instruction according to the token check.

The token-based memory access scheme described herein protects data dependency among memory access instructions.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
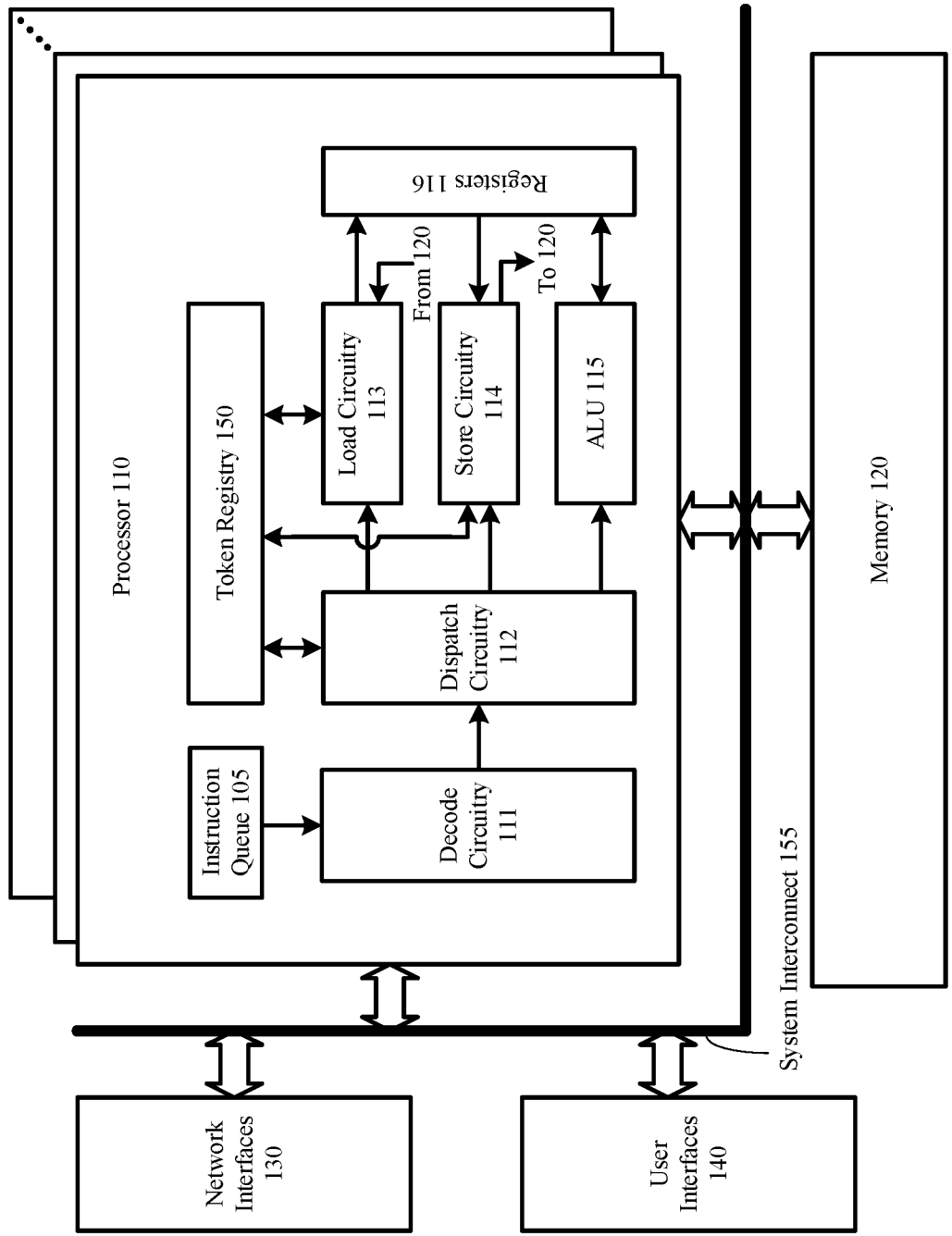
FIG. 1 illustrates a system including a token registry according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a token-based memory access scheme to protect data dependency among memory access instructions such as load instructions and store instructions. Each memory access instruction is assigned a token index. A token index may be used by a programmer to associate an instruction with a memory region to be accessed by the instruction. Two instructions may be assigned the same token index when both instructions access the same memory location or overlapping memory locations (or regions). Processor hardware can use the token indices as an indication of data dependency among the memory access instructions.

Unless specifically indicated otherwise, in the descriptions herein the term "load instructions" is used to include scalar load instructions and vector load instructions. Similarly, the term "store instructions" is used to include scalar store instructions and vector store instructions.

To prevent WAR hazards, a store instruction writes data to a memory location only after a load instruction completes reading the same memory location. To prevent RAW hazards, a store instruction reads the contents of a memory location only after a store instruction finishes writing the contents into the same memory location. The token-based scheme to be described herein assigns the same token index to the store instructions and the load instructions that access the same memory location in a program. During the instruction execution process, WAR and RAW hazards can be efficiently and effectively prevented by the processor hardware performing token checks. The token check for a received instruction determines whether the token index carried by the received instruction is in use. A used token index means that the previous instruction or instructions having the same token index as the received instruction are still in progress of execution. The received instruction may be dispatched but placed on hold for store/load execution until such previous instruction(s) are completed. The token check can be performed with low hardware cost and high efficiency, compared to conventional methods of memory barrier and range checking as described above.

In one embodiment, the token index is encoded in the instruction word. System hardware and software can easily check the token index for data dependency at an earlier stage of the execution pipeline, compared to conventional range checking where memory addresses are typically resolved in later stages of the execution pipeline.

FIG. 1 illustrates an example of a system 100 in which embodiments of the invention may operate. The system 100 includes one or more processors 110, such as central processing units (CPUs), graphics processing units (GPUs), vector processors, digital signal processors, and other general-purpose and special purpose processing circuitry. In one embodiment, the processors 110 are coupled to a memory 120, network interfaces 130 to connect to networks (e.g., a personal area network, a local area network, a wide area network, etc.), and user interfaces 140 (e.g., a display, a keyboard, a touch screen, speakers, etc.) via a system interconnect 155. The memory 120 may include on-chip and off-chip memory devices such as dynamic random access memory (DRAM), static RAM (SRAM), flash memory and other volatile and non-volatile memory devices. It is understood the embodiment of FIG. 1 is simplified for illustration purposes. Additional hardware components may be included in the system 100.

In one embodiment, the processor 110 includes hardware components which may include decode circuitry 111, dispatch circuitry 112, load circuitry 113, store circuitry 114, arithmetic and logic units (ALUs) 115 and registers 116. The decode circuitry 111 fetches instructions from an instruction queue 105 and decodes the instructions. The dispatch circuitry 112 dispatches the instructions to appropriate function units, such as the load circuitry 113, the store circuitry 114 and the ALUs 115. The instructions may include memory access instructions such as load instructions and store instructions. For load instructions, the load circuitry 113 may load (i.e., read) the operands from the memory 120 into registers 116. For store instructions, the store circuitry 114 may store (i.e., write) the operands in the registers 116 into the memory 120. The ALUs 115 may contain integer, floating-point and logical execution hardware for performing arithmetic and logic operations on the operands in the registers 116. The instructions may include scalar instructions and vector instructions. The operands (including source operands and destination operands) of a scalar instruction are scalars. The operands (including source operands and destination operands) of a vector instruction may include vectors. The processor 110 further includes a toke registry 150 to record token indices that are in use.

Figure 2:
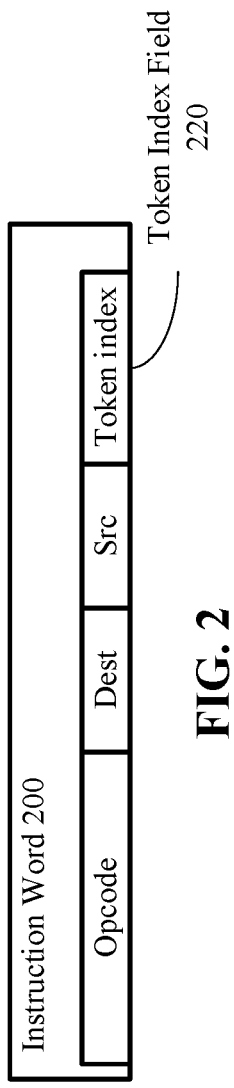
FIG. 2 illustrates a format of a memory access instruction according to one embodiment.

FIG. 2 illustrates an instruction word 200 that supports the token-based memory access according to one embodiment. According to the embodiment, the instruction set architecture (ISA) for the system 100 (FIG. 1) is designed such that each of the load instructions and the store instructions include a token index field 220. The token index field 220 contains a token, the value of which is referred to as the token index. A token index may be an integer or any other alphanumeric or symbolic indicator. The token index may be used by a user (e.g., a programmer writing software executed by the system 100) to indicate data dependency among two or more memory access instructions such as load and store. For instructions that do not have data dependency with other instructions, a default (i.e., reserved) token index may be used. The system 100 performs in-order execution of instructions having the same token index. Instructions having different token indices and instructions without tokens (i.e., having the reserved token) may be executed out of order.

Figure 3:
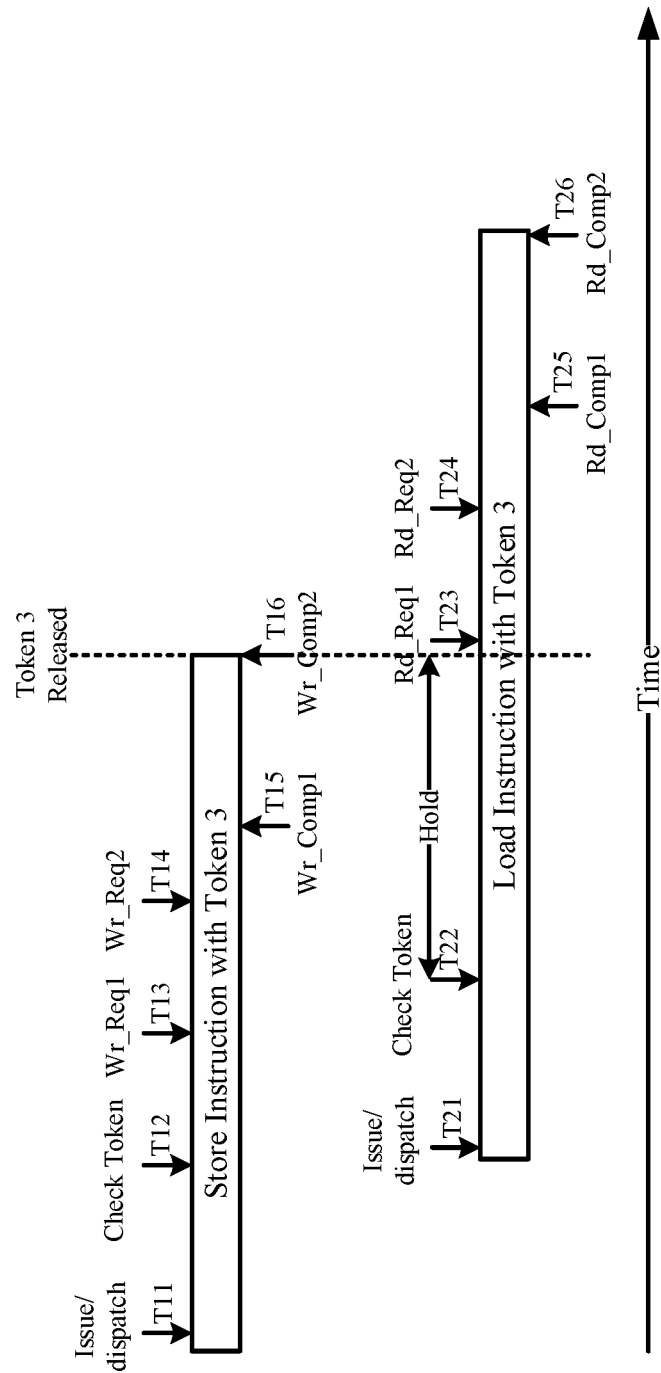
FIG. 3 illustrates an example of memory access execution according to one embodiment.

To illustrate how the token index may be used to prevent RAW hazards, FIG. 3 illustrates an example timeline of operations for a store instruction following by a load instruction, where both the store instruction and the load instruction have the same token index (e.g., token index=3, also referred to as token 3 in this example). At time T11, a store instruction with token index=3 is issued (i.e., dispatched). At time T12, a token check is performed to determine whether there is an in-progress (i.e., incomplete) load instruction having the same token index. In this example there is none. Thus, at T13 and T14, the store circuitry 114 (FIG. 1) sends write requests (Wr_Req1 and Wr_Req2) to the memory 120 for memory access.

In this example, a load instruction with token index=3 is issued at T21 after the issuance of the store instruction. Thus, at T22 the token check detects the in-progress store instruction being executed. The load instruction is held (i.e., pending) in the load circuitry 113 until token 3 is released upon the completion of the store instruction. In one embodiment, the memory 120 (or a memory controller) generates write_complete signals (Wr_Comp1 at T15 and Wr_Comp2 at T16) when the respective write operations to the memory 120 are completed. When receiving the last write complete signal at T16, the token registry 150 (FIG. 1) updates the "used" status of token 3; e.g., by removing an entry indicating token 3 as being used by the load instruction, thereby releasing token 3. When the load circuitry 113 detects from the token registry 150 that token 3 is released, the load circuitry 113 terminates the hold on the pending load instruction, and proceeds to send read request signals (Rd_Req1 at T23 and Rd_Req2 at T24) to the memory 120. The memory 120 (or memory controller) sends read complete signals (Rd_Comp1 at T25 and Rd_Comp2 at T26) when the respective read operations are completed.

In one embodiment, the token registry 150 may record the status of each token index (e.g., used or unused). Alternatively, the token registry 150 may record the used token indices only. If the token index is used, the token registry 150 may record an identifier of the instruction using the token index and the identifier of each instruction waiting for the token index. In the example of FIG. 3, when the load instruction is dispatched to the load circuitry 113, the load circuitry 113 may register the load instruction with the token registry 150 for token 3. Since token 3 is being used by the prior store instruction, the token registry 150 registers the status of the load instruction with token 3 as pending (or waiting, on hold, etc.). When token 3 is released at the completion of the store instruction, the status of token 3 may be updated from "used" to "unused." In one embodiment, an unused token index can be removed from the token registry 150. At this point, the hold on the load instruction ends and the token registry 150 removes the pending status of the load instruction. The status of token 3 may again be updated to "used" to indicate that the load instruction now obtains token 3. Token 3 is released at the completion of the load instruction.

Similar to the example of FIG. 3, WAR hazards can also be prevented with the same token-based memory access scheme when a store instruction follows a load instruction where both instructions have the same token index. The store instruction may be dispatched but placed on hold until the token is released at the completion of the load instruction.

Figure 4:
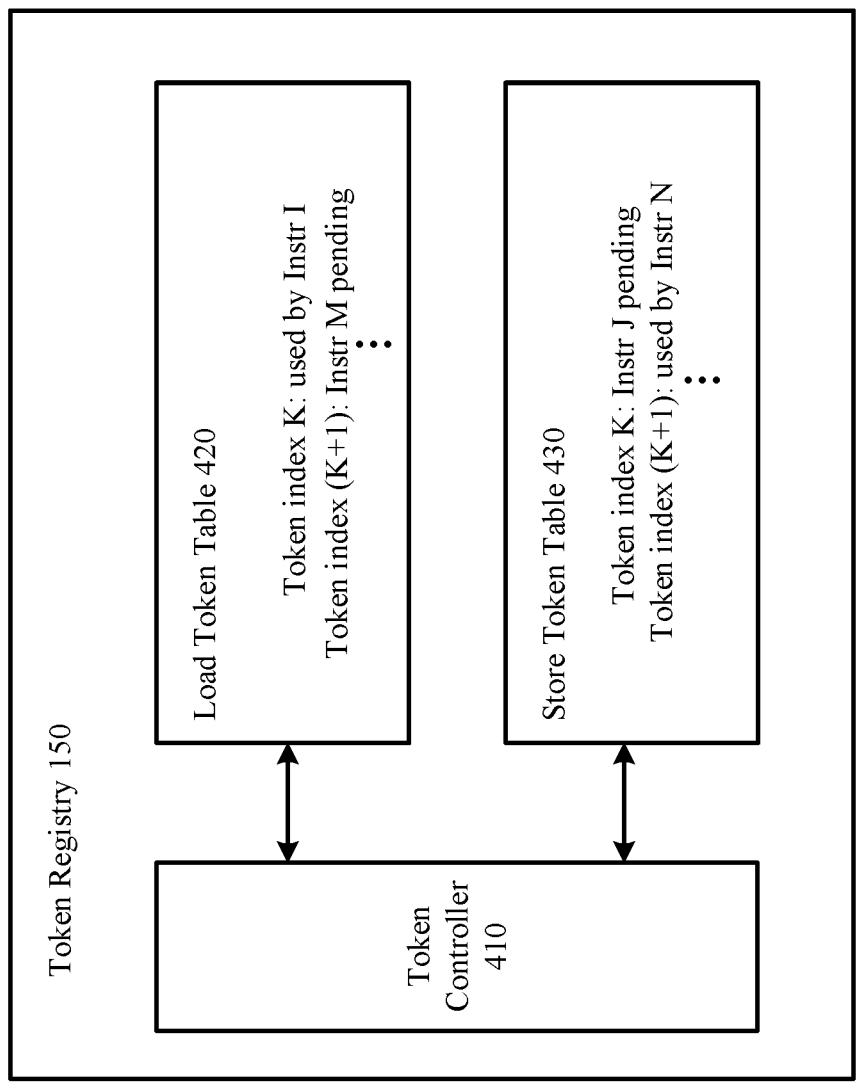
FIG. 4 illustrates a token registry according to one embodiment.

FIG. 4 illustrates the token registry 150 according to one embodiment. The token registry 150 in this example includes a token controller 410 and two token tables: a load token table 420 and a store token table 430. The load token table 420 records the status of token indices used by dispatched load instructions. The store token table 430 records the status of token indices used by dispatched store instructions. The token controller 410 performs token checking and token table updates. In one embodiment, the token registry 150 does not record the load/store instructions without tokens (or with the reserved token). In the example of FIG. 3, when the load circuitry 113 requests a token check for token 3, the token controller 410 checks the store token table 430 to determine whether token 3 is being used by a store instruction. When the store circuitry 114 requests a token check for token 3, the token controller 410 checks the load token table 420 to determine whether token 3 is being used by a load instruction.

In one embodiment, the load token table 420 also records each load instruction (or the identifier of the load instruction) that is using (i.e., has checked out) a token index, as well as each load instruction that is waiting (pending for execution) for a checked-out token index. Similarly, the store token table 430 records each store instruction (or the identifier of the store instruction) that is using (i.e., has checked out) a token index, as well as each store instruction that is waiting (pending for execution) for a checked-out token index. In alternative embodiments, the token tables 420 and 430 may be combined into one data structure or multiple data structures organized to increase the efficiency of token checks.

In one embodiment, the token tables 420 and 430 may have a configurable table depth, which may be one or more than one. The table depth limits, for each token index, the number of instructions that can be dispatched. For example, a table depth of one for both token tables 420 and 430 means that one pair of load instruction and store instruction carrying the same token index can be in the execution pipelines at the same time. An instruction is in the execution pipeline after the instruction is dispatched and before the instruction execution is completed. If the table depth is more than one, the token tables 420 and 430 may also record, for the instructions waiting for the release of a used token index, their positions in the wait queue.

In an embodiment where the table depth is more than one, multiple memory access instructions of the same type (i.e., multiple load instructions, or multiple store instructions) may be dispatched and concurrently executed in different stages of the execution pipeline. The load circuitry 113 and the store circuitry 114 execute their respective instruction in-order, so the instruction sequence is maintained within each of the circuitry 113 and 114.

Figure 5:
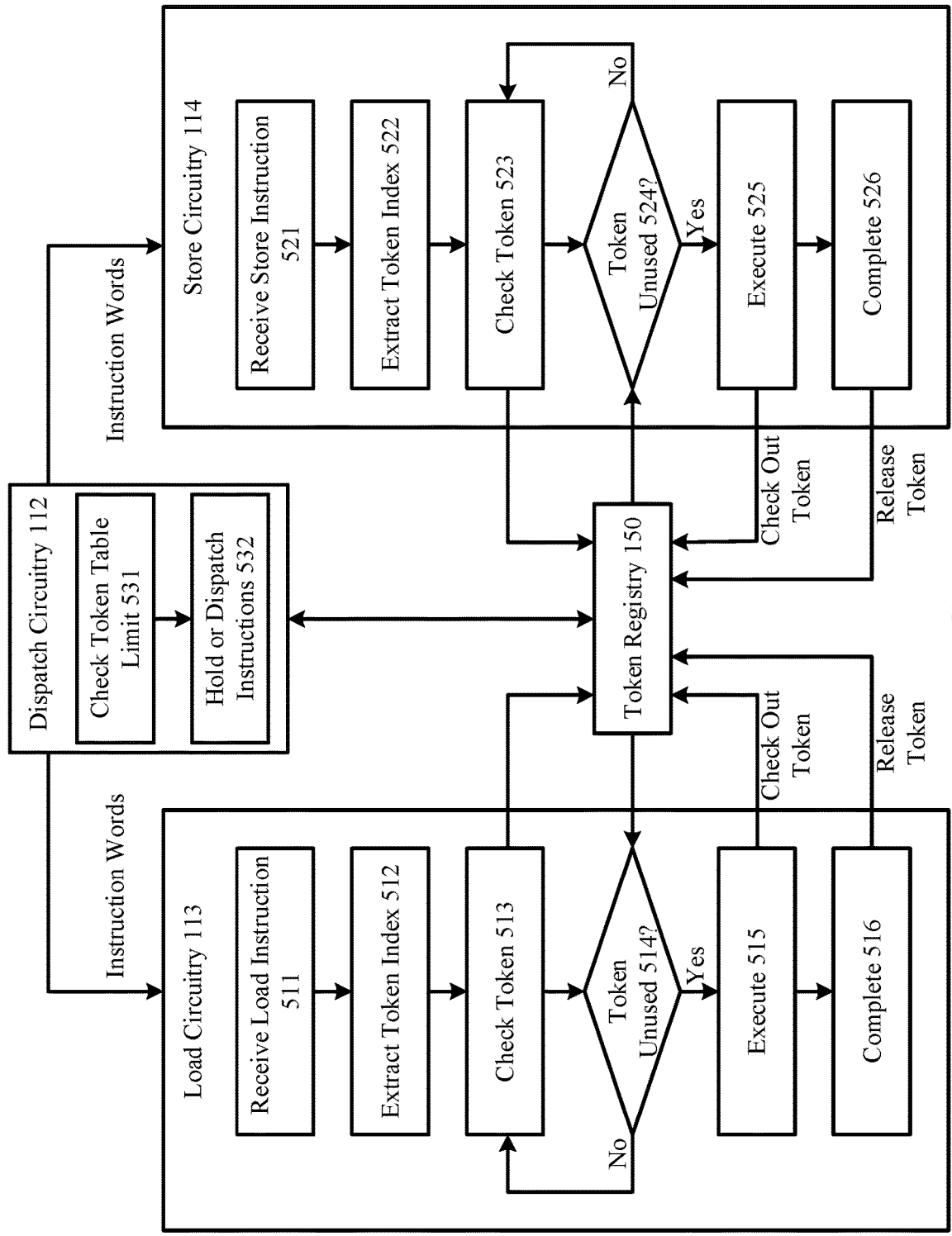
FIG. 5 illustrates token check operations performed by processor hardware according to an embodiment.

FIG. 5 illustrates token check operations performed by the dispatch circuitry 112, the load circuitry 113 and the store circuitry 114 according to one embodiment. In this example, only store instructions and load instructions are described. For each instruction to be dispatched, the dispatch circuitry 112 checks the token registry 150 for table depth limit at step 531 to determine whether to dispatch or to hold the instruction. If the table depth limit has not been reached for the token index carried by the instruction, the dispatch circuitry 112 dispatches the instruction to either the load circuitry 113 or the store circuitry 114 at step 532. If the table depth limit has been reached for the token index carried by the instruction, the dispatch circuitry 112 hold the instruction until that token index is released to a previously-dispatched pending instruction and the corresponding token table frees up one slot for that token index. Referring also to FIG. 4, the "corresponding token table" herein refers to the store token table 430 for a load instruction, or the load token table 420 for a store instruction. In some embodiments, the dispatch circuitry 112 may perform additional checks on the instruction before dispatching the instruction; the details of these additional checks are outside the scope of this disclosure.

With respect to the operations performed by the load circuitry 113, at step 511, the load circuitry 113 receives a load instruction dispatched by the dispatch circuitry 112. At step 512, the load circuitry 113 extracts a token index from the token index field of the load instruction. At step 513, the load circuitry 113 performs a token check; in one embodiment, the load circuitry 113 sends a token check request to the token registry 150 to determine from the store token table 430 whether the token index is used by any store instruction. If, at step 514, the token index is used by a store instruction, the execution of the load instruction pauses until the token index is released. If the token index is not used by any store instruction, the load circuitry 113 checks out the token (i.e., the token registry 150 records the token index in the load token table 420 as used), and the execution of the load instruction continues at step 515. When the execution completes at step 516, the load circuitry 113 releases the token by notifying the token registry 150 to update the load token table 420 (e.g., by recording the token index as unused, or removing the load instruction associated with the token index, etc.)

In one embodiment, the store circuitry 114 performs analogous operations (as shown in steps 521-526) to the operations performed by the load circuitry 113 (as shown in steps 511-516). In one embodiment, when performing a token check at step 523, the store circuitry 114 causes the load token table 420 to be checked to determine whether the token index in a received store instruction is used by any load instruction. If, at step 524, the token index is used by a load instruction, the execution of the store instruction pauses until the token index is released. If the token index is not used by any load instruction, the store circuitry 114 checks out the token, and the execution of the store instruction continues at step 525. When the execution completes at step 526, the store circuitry 114 releases the token by notifying the token registry 150 to update the store token table 430.

Figure 6:
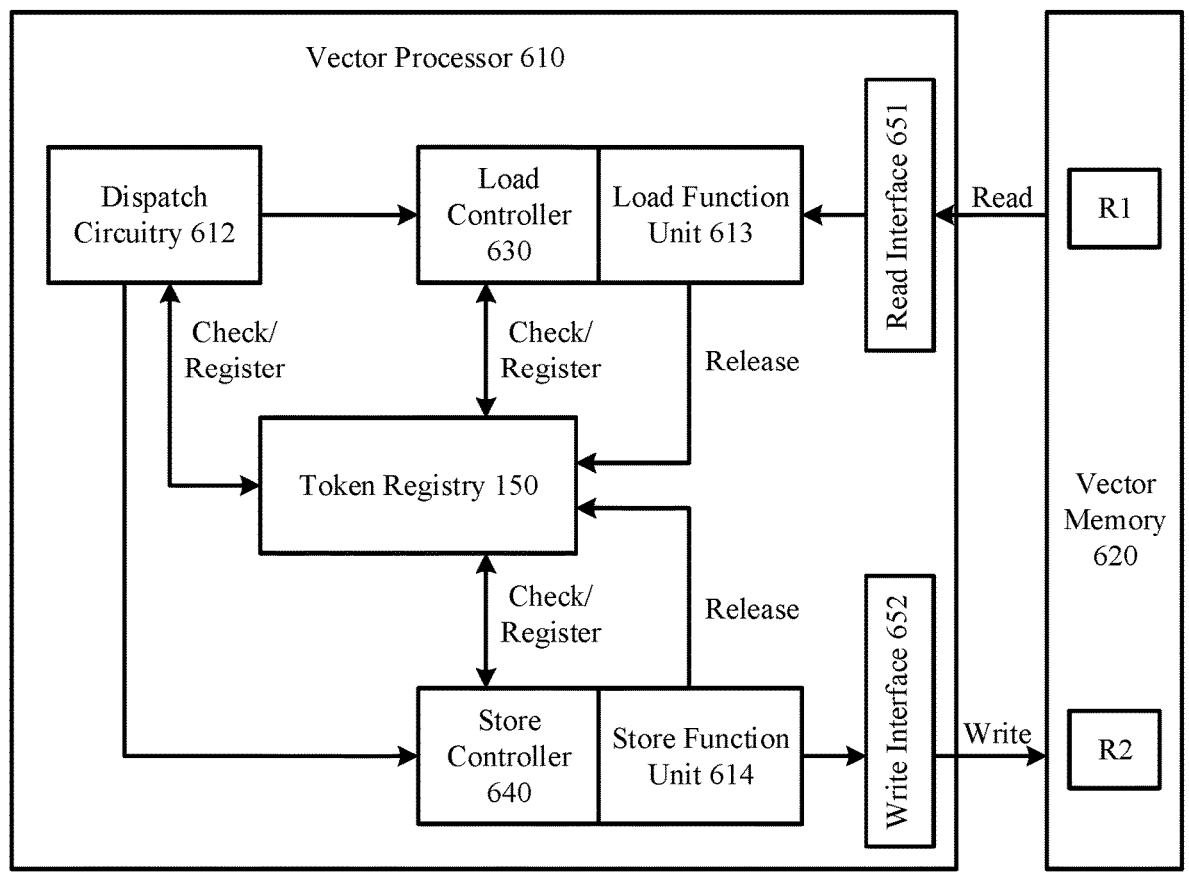
FIG. 6 illustrates a vector processor including a token registry according to an embodiment.

FIG. 6 is a diagram illustrating a vector processor 610 according to one embodiment. The vector processor 610 may be an example of the processor 110, although it is understood that the processor 110 may not be limited to a vector processor. The vector processor 610 is capable of executing vector instructions, each of which may operate on vector data such as data arrays of one or more dimensions. The vector instructions include load instructions and store instructions, which access vector data in a vector memory 620. The vector memory 620 may be part of the memory 120 of FIG. 1.

In the embodiment of FIG. 6, the token registry 150 performs the same operations as described before in connection with FIG. 1 and FIG. 5. The dispatch circuitry 612 checks the token registry 150 to determine whether a memory access instruction, such as a load instruction or a store instruction, can be dispatched. In one embodiment, when dispatching a memory access instruction, the dispatch circuitry 612 may register the token index carried by the memory access instruction with the token registry 150 in the corresponding token table (e.g., the load token table 420 for a load instruction, or the store token table 430 for a store instruction). The dispatch circuitry 612 may also dispatch other instructions that are not memory access instructions to corresponding function units (e.g., an add instruction to an ALU, which is not shown in this figure).

The dispatch circuitry 612 may dispatch a memory access instruction to either a load function unit 613 controlled by a load controller 630, or a store functional unit 614 controlled by a store controller 640. In one embodiment, the load controller 630 and the store controller 640 (instead of the dispatch circuitry 611) may register the token indices carried by the dispatched memory access instructions with the token registry 150 in the corresponding token table. The load controller 630 and the store controller 640 may request the token registry 150 for token checks and, according to results of token checks, pause the execution or continue the execution according to the steps described in FIG. 5.

The load function unit 613 executes load instructions by reading data from the vector memory 620 through a read interface 651. The store function unit 614 executes store instructions by writing data to the vector memory 620 through a write interface 652. The read interface 651 and the write interface 652 are independent of each other. As an example, a load instruction having a token index j may be used by a programmer to associate the load instruction with memory region R1; that is, token index j indicates that memory region R1 is to be accessed. A store instruction having a token index k may be used by a programmer to associate the store instruction with memory region R2; that is, token index k indicates that memory region R2 is to be accessed. The token registry 150 instead of recording the associations between token indices and memory regions (e.g., memory addresses), records the usage of token indices by load instructions and store instructions. The execution of a memory access instruction is paused when its token index is used by another memory access instruction of a different kind (e.g., a load instruction and a store instruction are different kinds of memory access instructions).

The load function unit 613 releases the token index (e.g., requests the token registry 150 to release the token) when execution of the load instruction carrying the token index is completed. Similarly, the store function unit 613 releases the token index (e.g., requests the token registry 150 to release the token) when execution of the store instruction carrying the token index is completed.

Figure 7:
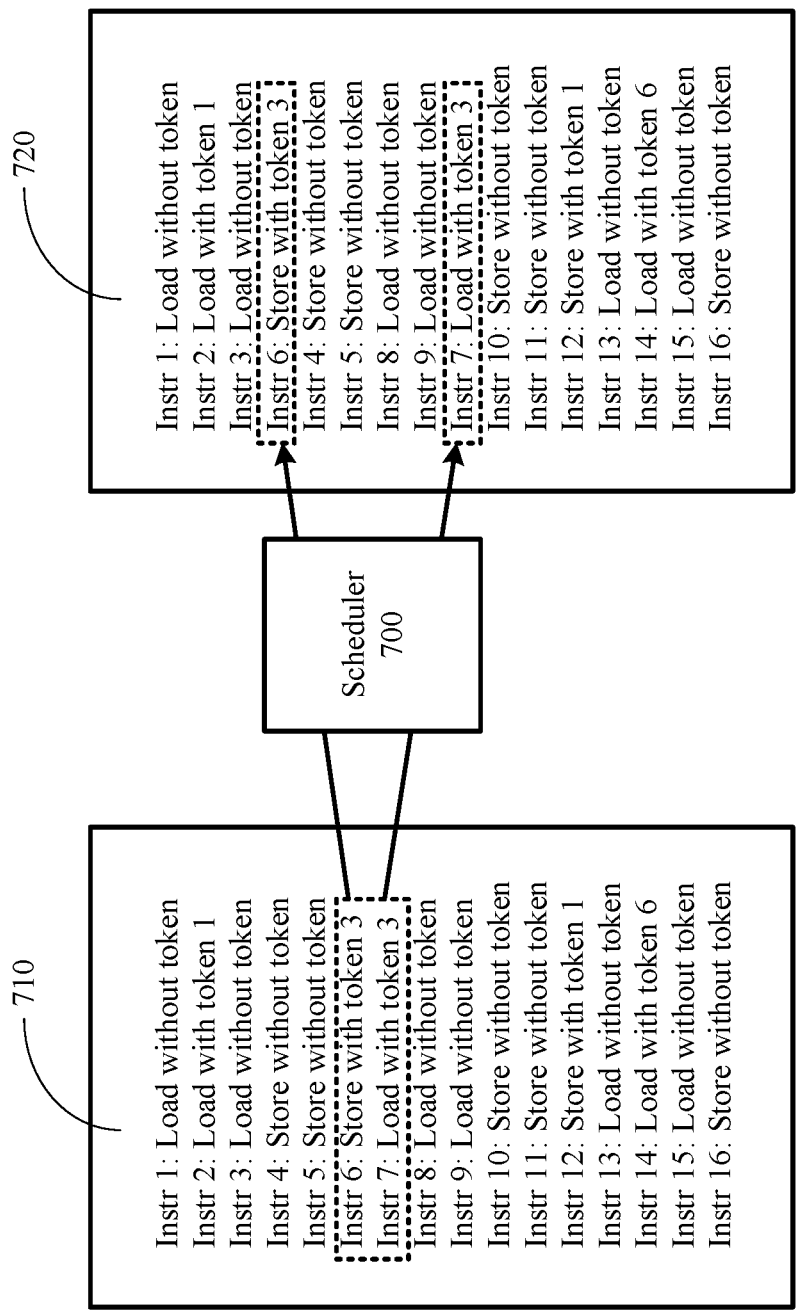
FIG. 7 illustrates out-of-order instruction scheduling according to an embodiment.

FIG. 7 illustrates an example in which an input sequence 710 of memory access instructions may be scheduled for out-of-order execution according to one embodiment. When a scheduler 700 receives the input sequence 710, according to the token indices, the scheduler 700 may schedule the instructions for out-of-order execution to generate an output sequence 720, thereby reducing the penalty from data dependency hazards. In this example, instructions 6 and 7 in the input sequence 710 are adjacent in time to each other. Instructions 6 and 7 carry the same token index=3, which means that they may present a RAW hazard. The token-based scheme described in connection with FIGS. 1-6 removes the hazard with a penalty in execution time caused by pausing the execution of the second instruction (in this example, instruction 7). The scheduler 700 may reduce the penalty by moving the first instruction (e.g., instruction 6) up and/or moving the second instruction (e.g., instruction 6) down in the sequence to generate the output sequence 720. Thus, by the time the second instruction starts execution, the first instruction may have already completed and released the token. The scheduler 700 may be a hardware scheduler within the processor 110 (FIG. 1). Alternatively, the scheduler 700 may be a software scheduler which is part of the operating system executed by the processor 110

In the example of FIG. 7, a number of the instructions are shown as "without tokens." An instruction without a token may be an instruction carrying a reserved token. In one embodiment, an instruction may carry a reserved token index to indicate that there is no dependency with respect to memory regions to be accessed between the instruction and other memory access instructions. In one embodiment, the scheduler 700 may move these instructions around such that data dependency may be steered away from the critical path of the program's execution, where the sequence 710 or 720 is part of the program.

Figure 8:
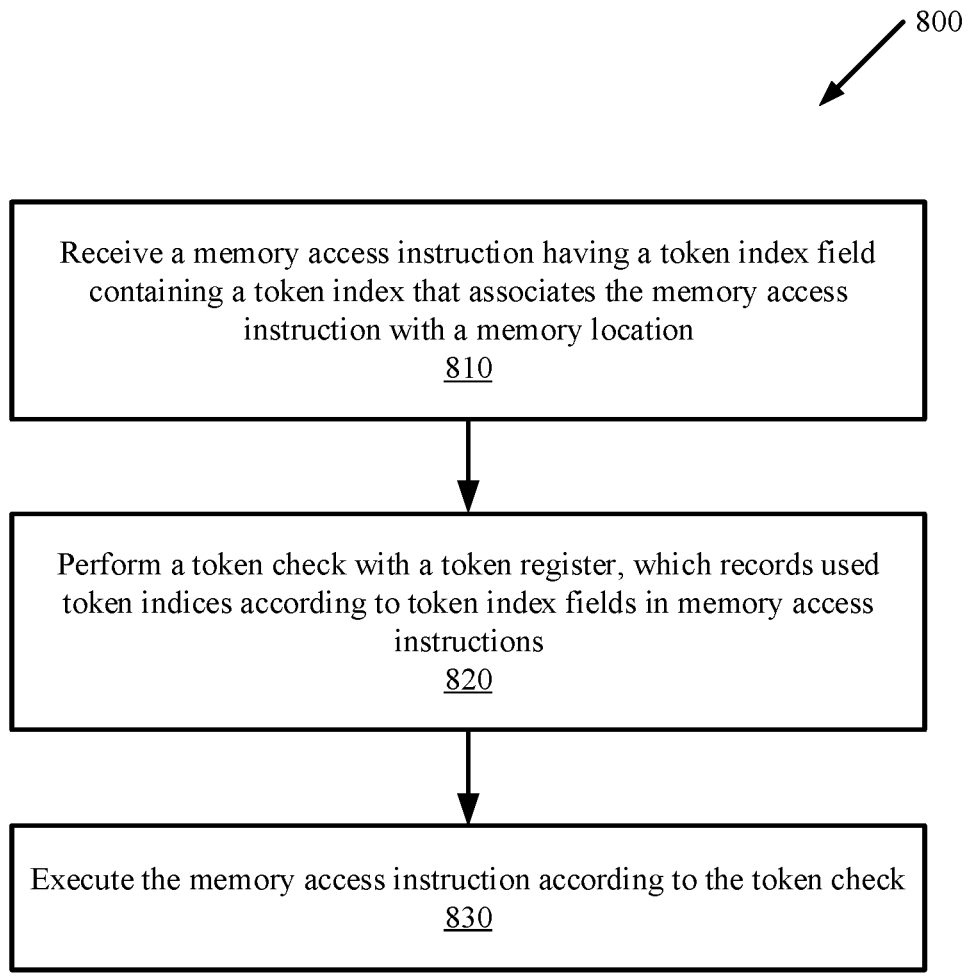
FIG. 8 is a flow diagram illustrating a method for protecting data dependency for memory access according to one embodiment.

FIG. 8 is a flow diagram illustrating a method 800 for protecting data dependency for memory access according to one embodiment. The method 800 may be performed by the processor 110 of FIG. 1 or the vector processor 610 of FIG. 6.

The method 800 begins at step 810 with the processor receiving a memory access instruction having a token index field, where the token field contains a token index that associates the memory access instruction with a memory location. The processor at step 820 performs a token check with a token register, which records used token indices according to token index fields in memory access instructions. The processor executes the memory access instruction according to the token check at step 830.

The operations of the flow diagram of FIG. 8 has been described with reference to the exemplary embodiments of FIGS. 1 and 6. However, it should be understood that the operations of the flow diagram of FIG. 8 can be performed by embodiments of the invention other than the embodiments of FIGS. 1 and 6, and the embodiments of FIGS. 1 and 6 can perform operations different than those discussed with reference to the flow diagram. While the flow diagram of FIG. 8 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A device operative to protect data dependency for memory access, comprising:
   a memory; and
   a processor coupled to the memory to execute memory access instructions including load instructions and store instructions, the processor including:
      load circuitry to execute the load instructions;
      store circuitry to execute the store instructions, wherein each memory access instruction includes an opcode, an operand field, and a token index field, and wherein the token index field contains a token index that associates the memory access instruction with a memory location;
      dispatch circuitry to dispatch instructions to the load circuitry and the store circuitry; and
      a token registry to record used token indices according to token index fields in the memory access instructions dispatched by the dispatch circuitry.

2. The device of claim 1, wherein the load circuitry is further operative to:
   check the token registry for a given token index when receiving a load instruction having the given token index; and
   in response to a determination that the given token index is in use by a store instruction, place the load instruction on hold until the given token index is released at completion of the store instruction.

3. The device of claim 1, wherein the store circuitry is further operative to:
   check the token registry for a given token index when receiving a store instruction having the given token index; and
   in response to a determination that the given token index is in use by a load instruction, place the store instruction on hold until the given token index is released at completion of the load instruction.

4. The device of claim 1, wherein the token registry includes circuitry to check token indices used by the store instructions when a token check is requested by the load circuitry.

5. The device of claim 1, wherein the token registry includes circuitry to check token indices used by the load instructions when a token check is requested by the store circuitry.

6. The device of claim 1, wherein the dispatch circuitry is operative to dispatch an instruction having a given token index in response to a determination that the number of instructions having the given token index in a corresponding token table of the token registry does not exceed a table depth limit.

7. The device of claim 1, further comprises a scheduler operative to schedule the memory access instructions in an instruction sequence according to respective token indices carried by the memory access instructions.

8. The device of claim 1, wherein the token registry is operative to record token indices being used and instruction identifiers waiting for the used token indices.

9. The device of claim 1, wherein the load circuitry and the store circuitry are operative to concurrently execute instructions having different token indices.

10. The device of claim 1, wherein a reserved token index in the token index field of a given instruction indicates that there is no dependency with respect to memory locations to be accessed between the given instruction and other memory access instructions.

11. A method of protecting data dependency for memory access, comprising:
    receiving a memory access instruction which includes an opcode, an operand field, and a token index field, wherein the token index field contains token index that associates the memory access instruction with a memory location;
    performing a token check with a token register, which records used token indices according to token index fields in memory access instructions; and
    executing the memory access instruction according to the token check.

12. The method of claim 11, wherein performing the token check further comprises:
    checking the token registry for a given token index when receiving a load instruction having the given token index; and
    in response to a determination that the given token index is in use by a store instruction, placing the load instruction on hold until the given token index is released at completion of the store instruction.

13. The method of claim 11, wherein performing the token check further comprises:
    checking the token registry for a given token index when receiving a store instruction having the given token index; and
    in response to a determination that the given token index is in use by a load instruction, placing the store instruction on hold until the given token index is released at completion of the load instruction.

14. The method of claim 11, wherein performing the token check further comprises:
    checking the token indices used by store instructions when the token check is requested by load circuitry executing a load instruction.

15. The method of claim 11, wherein performing the token check further comprises:
    checking token indices used by load instructions when the token check is requested by store circuitry executing a store instruction.

16. The method of claim 11, further comprising:
    dispatching an instruction having a given token index in response to a determination that the number of instructions having the given token index in a corresponding token table of in the token registry does not exceed a table depth limit.

17. The method of claim 11, further comprising:
    scheduling the memory access instructions in an instruction sequence according to respective token indices carried by the memory access instructions.

18. The method of claim 11, further comprising:
    recording, in the token registry, token indices being used and instruction identifiers waiting for the used token indices.

19. The method of claim 11, further comprising:
concurrently executing a load instruction and a store instruction that carry different token indices.

20. The method of claim 11, wherein a reserved token index in the token index field of a given instruction indicates that there is no dependency with respect to memory locations to be accessed between the given instruction and other memory access instructions.

* * * * *